(12) United States Patent
Gaspar

(10) Patent No.: US 12,005,966 B2
(45) Date of Patent: Jun. 11, 2024

(54) LIGHT-WEIGHT BODY MOUNT ASSEMBLY

(71) Applicant: The Pullman Company, Milan, OH (US)

(72) Inventor: Zoren E. Gaspar, Huron, OH (US)

(73) Assignee: The Pullman Company, Milan, OH (US)

( * ) Notice: Subject to any disclaimer, the term of this patent is extended or adjusted under 35 U.S.C. 154(b) by 955 days.

(21) Appl. No.: 17/008,044

(22) Filed: Aug. 31, 2020

(65) Prior Publication Data

US 2022/0063732 A1    Mar. 3, 2022

(51) Int. Cl.
*B62D 27/04*      (2006.01)
*B60G 99/00*      (2010.01)
(Continued)

(52) U.S. Cl.
CPC .......... *B62D 27/04* (2013.01); *B60G 99/002* (2013.01); *F16F 1/38* (2013.01); *F16F 15/08* (2013.01);
(Continued)

(58) Field of Classification Search
CPC .......... F16F 1/38; F16F 1/3735; F16F 1/3849; F16F 15/08; F16F 15/022; F16F 15/0275; F16F 2224/02; F16F 2224/025; F16F 2224/0208; F16F 2230/0005; F16F 2232/08; F16F 2234/02; F16F 3/0873; F16F 13/085; F16F 13/103; F16F 9/49; B62D 24/02; B62D 25/088; B62D 27/04; B60G 99/002
(Continued)

(56) References Cited

U.S. PATENT DOCUMENTS

| 7,389,977 B1 | 6/2008 | Fernandez et al. |
| 8,157,251 B2 | 4/2012 | Tanaka et al. |

(Continued)

FOREIGN PATENT DOCUMENTS

| EP | 3290741 | 3/2018 |
| JP | 60237241 A * | 11/1985 |

(Continued)

OTHER PUBLICATIONS

International Search Report for International Application PCT/US2021/043454, dated Nov. 5, 2021.

*Primary Examiner* — Robert A. Siconolfi
*Assistant Examiner* — San M Aung
(74) *Attorney, Agent, or Firm* — Burris Law, PLLC

(57) ABSTRACT

A vehicle body mount assembly includes an inner metal sleeve, a polymer mounting bracket with a damper opening oriented coaxially with the inner metal sleeve, an elastomeric damper disposed within the damper opening between the inner metal sleeve and the polymer mounting bracket, at least one fastening element embedded in and extending from the polymer mounting bracket, and a ferrule disposed at least partially within the inner metal sleeve. A polymer outer sleeve can be included and disposed between elastomeric damper and the polymer mounting bracket. Also, the at least one fastening element can be a stud bolt with a head embedded in the polymer mounting bracket, a nut embedded in the polymer mounting bracket, or a metal sleeve configured for a bolt to extend therethrough embedded in the polymer mounting bracket.

20 Claims, 5 Drawing Sheets

(51) Int. Cl.
*F16F 1/38* (2006.01)
*F16F 15/08* (2006.01)

(52) U.S. Cl.
CPC ...... *B60G 2202/20* (2013.01); *F16F 2224/02* (2013.01); *F16F 2224/0208* (2013.01); *F16F 2224/025* (2013.01); *F16F 2230/0005* (2013.01); *F16F 2232/08* (2013.01); *F16F 2234/02* (2013.01)

(58) Field of Classification Search
USPC ............................................. 267/293
See application file for complete search history.

(56) References Cited

U.S. PATENT DOCUMENTS

| | | | |
|---|---|---|---|
| 8,246,021 B2* | 8/2012 | Shand | B60G 99/002 267/141.1 |
| 8,430,373 B2 | 4/2013 | Nishi et al. | |
| 9,605,728 B2 | 3/2017 | Mcmullen | |
| 10,507,715 B1 | 12/2019 | Kim | |
| 10,611,227 B2 | 4/2020 | Kim | |
| 2009/0102218 A1* | 4/2009 | Fernandez | F16F 13/14 296/35.1 |
| 2015/0298745 A1 | 10/2015 | Mcmullen | |
| 2018/0058535 A1* | 3/2018 | Snyder | F16F 15/022 |
| 2019/0368523 A1 | 12/2019 | Vanhuis | |
| 2020/0049225 A1* | 2/2020 | Robinson | F16F 13/14 |

FOREIGN PATENT DOCUMENTS

| | | |
|---|---|---|
| JP | 2000337443 | 12/2000 |
| JP | 2000337443 A * | 12/2000 |
| JP | 4081421 | 2/2008 |
| JP | 4081422 | 2/2008 |
| JP | 4861875 | 11/2011 |

* cited by examiner

LIGHT-WEIGHT BODY MOUNT ASSEMBLY

FIELD

The present disclosure relates to body mount assemblies and particularly to body-on-frame vehicle body mount assemblies.

BACKGROUND

The statements in this section merely provide background information related to the present disclosure and may not constitute prior art.

The manufacture of body-on-frame vehicles includes mounting pre-assembled bodies onto pre-assembled frames using a plurality of shear style mounts between the bodies and frames. The shear style mounts (referred to herein as "body mount assemblies" or "body mount assembly") typically have an elastomeric (e.g., rubber) damper bonded to and between an inner metal sleeve and an outer metal sleeve. In the alternative, an inner metal sleeve is bonded to an outer elastomeric damper that is assembled within an outer metal sleeve. The outer metal sleeve includes a pair of flanges with bolts (e.g., stud bolts) that extend from and/or through the pair of flanges to attach the body mount assembly to the frame. Also, upper and lower ferrules are affixed to the inner sleeve and a threaded fastener (e.g., a bolt) extends through an aperture of the body and the inner sleeve to couple or attach the body to the body mount assembly and thus to the frame.

During use, the body mount assemblies are exposed to dirt, dust, water, and possibly road salt, thereby requiring the outer metal sleeve to be coated with a corrosion resistant coating. Also, the outer metal sleeve adds weight to the body mount assembly and the vehicle.

The present disclosure addresses the issues of body mount assemblies with outer metal sleeves among other issues related to body mount assemblies.

SUMMARY

This section provides a general summary of the disclosure and is not a comprehensive disclosure of its full scope or all of its features.

In one form of the present disclosure, a vehicle body mount assembly includes an inner metal sleeve, a polymer mounting bracket with a damper opening oriented coaxially with the inner metal sleeve, an elastomeric damper disposed within the damper opening between the inner metal sleeve and the polymer mounting bracket, at least one fastening element embedded in and extending from the polymer mounting bracket, and a ferrule disposed at least partially within the inner metal sleeve. In some variations, a polymer outer sleeve is included and disposed between elastomeric damper and the polymer mounting bracket.

In some variations, the polymer mounting bracket and/or the polymer outer sleeve are formed from a thermoplastic material selected from the group consisting of nylon, polybenzimidazole (PBI), polycarbonate (PC), polyether sulfone (PES), polyoxymethylene (POM), polyether ether ketone (PEEK), polyetherimide (PEI), polyethylene (PE), polyphenylene oxide (PPO), polyphenylene sulfide (PPS), polypropylene (PP), polyvinyl chloride (PVC), polyvinylidene fluoride, PVDF, and combinations thereof.

In at least one variation, the elastomeric damper is molded onto and extends between the inner metal sleeve and the polymer outer sleeve. In such a variation, the elastomeric damper has a first end and a second end spaced apart from the first end, the inner metal sleeve extends between the first end and the second end, the ferrule is a metal ferrule disposed on the first end, and the polymer outer sleeve and the polymer mounting bracket are disposed proximate to the second end and spaced apart from the metal ferrule.

In some variations, the elastomeric damper has a first end and a second end spaced apart from the first end, the inner metal sleeve extends between the first end and the second end, the ferrule is a metal ferrule disposed on the first end, and the polymer mounting bracket is disposed proximate to the second end and spaced apart from the metal ferrule.

In at least one variation, the at least one fastening element includes at least one stud bolt with a head embedded in the polymer mounting bracket and a threaded shaft extending away from the head. In another variation, the at least one fastening element includes at least one nut embedded in the polymer mounting bracket. In still another variation, the at least one fastening element includes at least one metal sleeve embedded in the polymer mounting bracket, the at least one sleeve configured for a bolt to extend therethrough.

In some variations, the elastomeric damper has a first end and a second end spaced apart from the first end, the inner metal sleeve extends between the first end and the second end, the ferrule is a metal ferrule disposed on the first end, and the polymer mounting bracket is disposed proximate to the second end and spaced apart from the metal ferrule.

In at least one variation another metal ferrule disposed on the inner metal sleeve and spaced apart from the metal ferrule is included.

In some variations, the at least one fastening element is a pair of threaded fasteners, each of the pair of threaded fasteners comprises a head portion embedded in the polymer mounting bracket and a shaft portion extending from the polymer mounting bracket, and the pair of threaded fasteners are positioned and configured to extend through a pair of apertures in a vehicle frame component such that a locking joint is formed between the vehicle body mount assembly and the vehicle frame component.

In at least one variation, the vehicle body mount assembly is free of or does not include an outer metal sleeve.

In another form of the present disclosure, a vehicle body mount assembly includes a damper unit having an elastomeric damper, an inner sleeve disposed within the elastomeric damper, a ferrule coaxial with the inner sleeve and disposed on the elastomeric damper and the inner sleeve, an outer sleeve coaxial with the inner sleeve and the elastomeric damper molded onto and extending between the inner sleeve and the outer sleeve, and a mounting bracket coaxial with the inner sleeve and disposed on the inner sleeve. The vehicle body mount assembly also includes at least one fastening element embedded within the mounting bracket. In at least one variation, the vehicle body mount assembly is free or devoid of an outer metal sleeve.

In some variations, the inner sleeve is an inner metal sleeve, the ferrule is a metal ferrule, the outer sleeve is a thermoplastic outer sleeve, and the mounting bracket is a thermoplastic mounting bracket.

In at least one variation, the at least one fastening element includes at least one stud bolt with a head embedded in the thermoplastic mounting bracket, a nut embedded in the thermoplastic mounting bracket, and at least one metal sleeve embedded in the thermoplastic mounting bracket, the at least one sleeve configured for a threaded shaft to extend therethrough.

In some variations, the elastomeric damper comprises a first end and a second end spaced apart from the first end, the inner sleeve extends between the first end and the second end, the ferrule is a metal ferrule disposed on the first end, and the mounting bracket is disposed proximate to the second end and spaced apart from the metal ferrule.

In still another form of the present disclosure, a vehicle body mount assembly includes a damper unit having an elastomeric damper, an inner sleeve disposed within the elastomeric damper, a ferrule coaxial with the inner sleeve and disposed on the elastomeric damper and the inner sleeve, a mounting bracket coaxial with the inner sleeve and the elastomeric damper molded onto the inner sleeve and extending between the mounting bracket and the inner sleeve, and at least one fastening element embedded within the mounting bracket. In at least one variation, the vehicle body mount assembly is free or devoid of an outer metal sleeve.

In some variations, the inner sleeve is an inner metal sleeve, the ferrule is a metal ferrule, and the mounting bracket is a thermoplastic mounting bracket.

In at least one variation, the at least one fastening element comprises at least one of a stud bolt with a head embedded in the thermoplastic mounting bracket, a nut embedded in the thermoplastic mounting bracket, and a metal sleeve embedded in the thermoplastic mounting bracket, the metal sleeve configured for a threaded shaft to extend therethrough.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
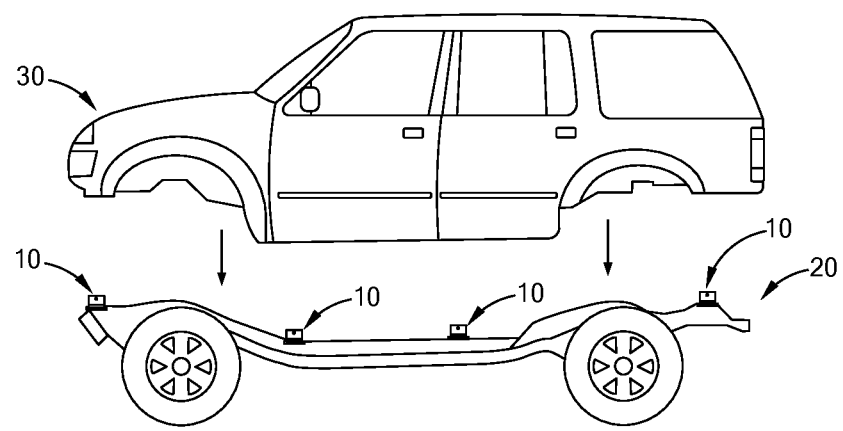
FIG. 1 is a side view of a vehicle body to be mounted on a frame using a light-weight body mount assembly according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. Examples are provided to fully convey the scope of the disclosure to those who are skilled in the art. Numerous specific details are set forth such as types of specific components and devices to provide a thorough understanding of variations of the present disclosure. It will be apparent to those skilled in the art that specific details need not be employed and that the examples provided herein, may include alternative forms or variations and are not intended to limit the scope of the disclosure. In some examples, well-known processes, well-known device structures, and well-known technologies are not described in detail.

Referring to FIG. 1, a vehicle body 30 being mounted onto a frame 20 is shown. Particularly, on an assembly line (not shown), the frame 20 and the vehicle body 30 are positioned and brought into proximate position with each other and a plurality of light-weight body mount assemblies 10 are used to securely mount or attach the vehicle body 30 to the frame 20 as described in greater detail below.

Figure 2:
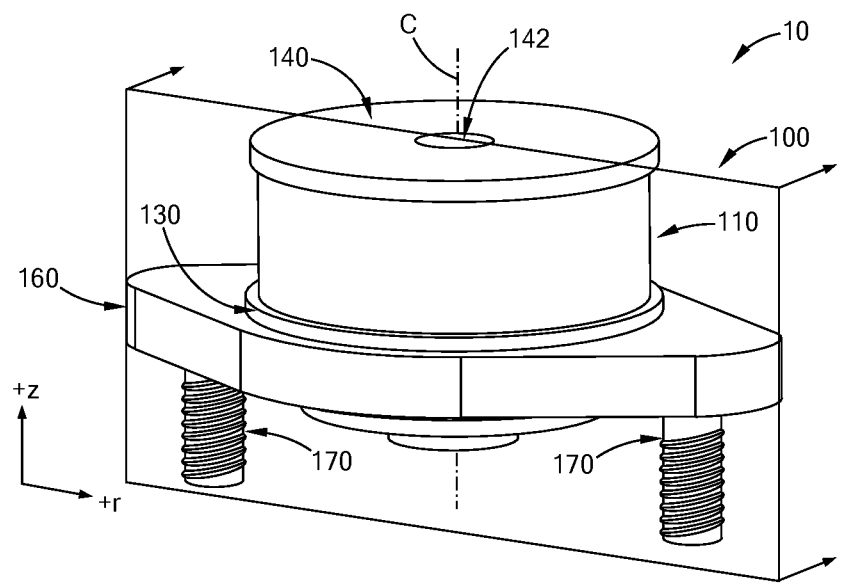
FIG. 2 is a perspective view of a light-weight body mount assembly according to one form of the present disclosure.
Figure 3:
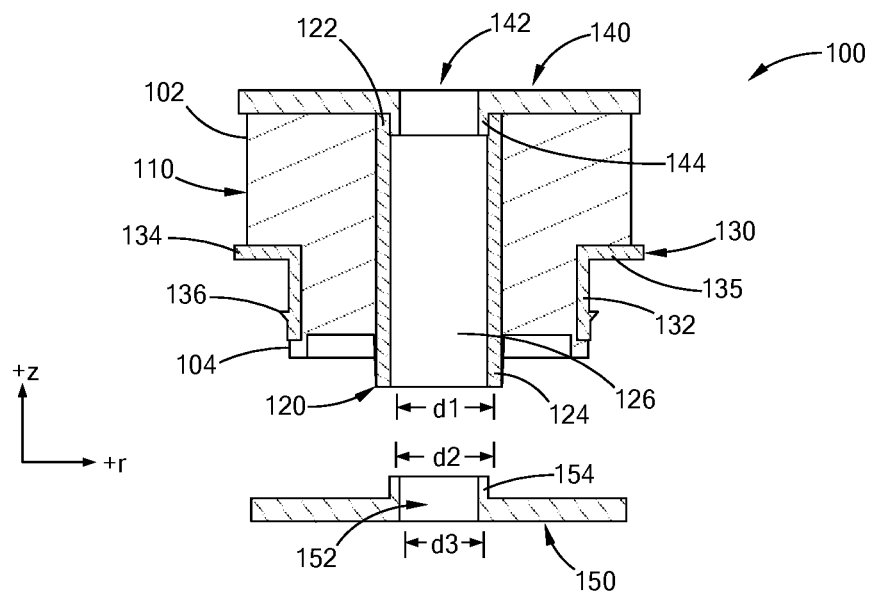
FIG. 3 is a cross-sectional view of the light-weight body mount assembly in FIG. 2 without a mounting bracket.
Figure 4:
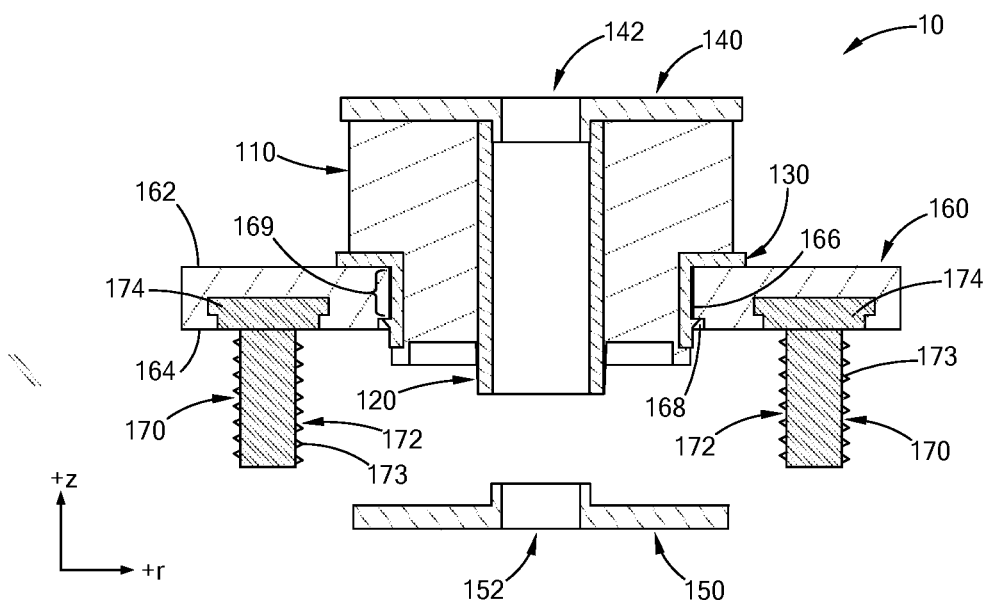
FIG. 4 is a cross-sectional view of the light-weight body mount assembly in FIG. 2 with a mounting bracket.

Referring to FIGS. 2-4, a light-weight body mount assembly 10 according to one form of the present disclosure is shown. The light-weight body mount assembly 10 has a central axis 'C' (referred to hereafter as the "C-axis"), a damper unit 100 and a pair of threaded fasteners 170. The damper unit 100 includes an elastomeric damper 110, an inner metal sleeve 120, an outer sleeve 130 and a mounting bracket 160. The elastomeric damper 110 extends from a first end 102 to a second end 104. The inner metal sleeve 120 has an opening 126 (FIG. 3) extending along a length direction (z-direction) of the inner metal sleeve 120 from an upper (+z direction) end 122 to a lower (−z direction) end 124. Also, the inner metal sleeve 120 is oriented coaxially with the C-axis. The outer sleeve 130 has a damper opening (not labeled) oriented coaxially with the C-axis and the elastomeric damper 110 is disposed within the damper opening between the inner metal sleeve 120 and the outer sleeve 130. In some variations of the present disclosure, the elastomeric damper 110 is molded directly onto the inner metal sleeve 120 and/or the outer sleeve 130.

In at least one variation, the outer sleeve 130 includes a sidewall 132 and a flange 134 extending from (e.g., outwardly) the sidewall 132. In some variations, a rib 136 extends outwardly, i.e., away from the C-axis, from the sidewall 132 such that the mounting bracket 160 can be assembled and attached to the outer sleeve as shown in FIG. 4. For example, in at least one variation the mounting bracket 160 has an upper (+z direction) surface 162, a lower (−z direction) surface 164, an inner surface 166 defining an inner groove 168, and an attachment portion 169 configured to be positioned and fixed between a lower surface 135 of the flange 134 and the rib 136. The rib 136 of the outer sleeve 130 is configured to elastically deform such that the inner surface 166 of the mounting bracket slides up (+z direction) and over the rib 136 until the rib 136 engages the inner groove 168 and the mounting bracket 160 is securely attached to the outer sleeve 130. In the alternative, the mounting bracket 160 is attached to the outer sleeve 130 with a different attachment method, technique or structure such as, but not limited to, molding the mounting bracket 160 directly onto the outer sleeve 130, use of an adhesive, an ultrasonic weld, and/or a threaded engagement, among others.

In some variations, an upper ferrule 140 with an opening 142 extending through a collar 144 oriented coaxially with the C-axis is disposed at least partially within the upper end 122 of the inner metal sleeve 120 as shown in FIGS. 3 and 4. In at least one variation, a lower ferrule 150 with an opening 152 extending through a collar 154 and oriented coaxially with the C-axis is included and can be disposed at least partially within the lower end 124 of the inner metal sleeve 120. For example, and as shown in FIG. 3, the opening 126 of the inner metal sleeve 120 has an inner dimension 'd1' and the collar 144 of the upper ferrule 140 has an outer dimension 'd2' (e.g., an outer diameter—shown in relation to bottom ferrule 150) configured to fit and be positioned within the opening 126 of the inner metal sleeve 120. Also, the opening 142 of the upper ferrule 140 has an inner dimension 'd3' (e.g., an inner diameter—shown in relation to bottom ferrule 150) configured for a shaft to fit within and extend through as discussed in greater detail below.

The pair of threaded fasteners 170 shown in FIG. 4 is in the form of a pair of bolts. Each of the threaded fasteners 170 having a shaft 172 with threads 173 and a head 174. In some variations the head 174 is embedded in the mounting bracket 160 as shown in FIG. 4. For example, the head 174 can be molded into the mounting bracket 160 (i.e., the mounting bracket is molded onto the head 174). In such variations the number of parts to be handled and assembled by an individual on an assembly line during mounting or attaching the light-weight body mount assembly 10 to a vehicle frame is reduced (i.e., separate bolts are not needed).

The elastomeric damper 110 is made from any suitable material for a vehicle shear style mount. Non limiting examples of materials used to make the elastomeric damper 110 include natural rubber, styrene-butadiene rubber, butyl, nitrile, Neoprene® (polychloroprene), ethylene propylene diene monomer (EPDM) rubber, silicone, fluoroelastomers such as Viton®, polyurethane, hydrogenated nitrile, acrylic, and acrylonitrile butadiene styrene and combinations thereof, among others.

The inner metal sleeve 120, the upper and lower ferrules 140, 150, and/or the threaded fasteners 170 is made from metallic materials such as but not limited to steels, nickel-base alloys, aluminum alloys, and titanium alloys, among others. The outer sleeve 130 and the mounting bracket 160 are made from light-weight materials including but not limited to aluminum alloys, titanium alloys, and polymers such as nylon, polybenzimidazole (PBI), polycarbonate (PC), polyether sulfone (PES), polyoxymethylene (POM), polyether ether ketone (PEEK), polyetherimide (PEI), polyethylene (PE), polyphenylene oxide (PPO), polyphenylene sulfide (PPS), polypropylene (PP), polyvinyl chloride (PVC), polyvinylidene fluoride, PVDF, and combinations thereof, among others. As used herein, the term "light-weight" refers to a material with a density less than steel with steel alloys having a density ranging from about 7.75 grams per cubic centimeter (g/cm$^3$) to about 8.05 g/cm$^3$.

Figure 5:
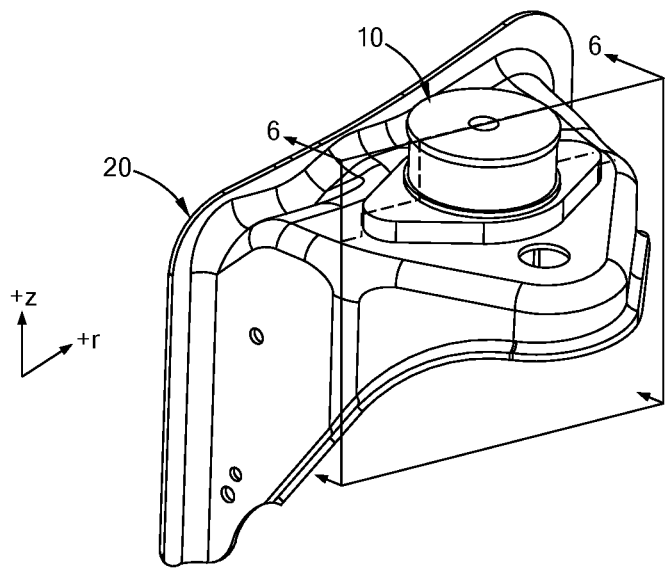
FIG. 5 is perspective view of the light-weight body mount assembly in FIG. 2 mounted to a frame.
Figure 6:
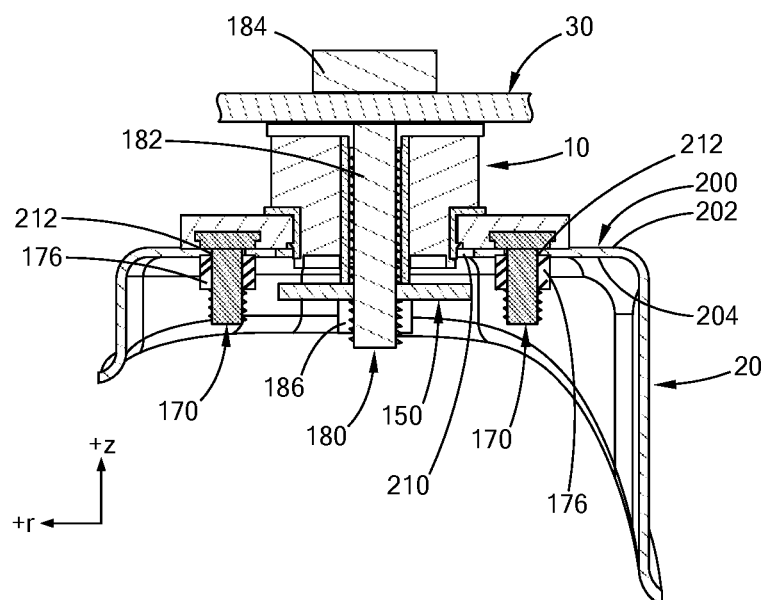
FIG. 6 is cross-sectional view of section 6-6 in FIG. 5 with the light-weight body mount assembly providing a mount or attachment between mounting a body and the frame.

Referring to FIGS. 5 and 6, the light-weight body mount assembly 10 mounted to the frame 20 is shown in FIG. 5 and the vehicle body 30 mounted to the frame 20 with the light-weight body mount assembly 10 is shown in FIG. 6. The frame 20 includes a panel 200 with an upper surface 202, a lower surface 204, a bracket hole 210, and a pair of apertures 212. The bracket hole 210 is dimensioned such that the outer sleeve 130 of the light-weight body mount assembly 10 fits within the bracket hole 210 and the lower surface 164 of the mounting bracket 160 can be in direct contact with upper surface 202. Also, the apertures 212 are positioned within the panel 200, and relative to the bracket hole 210, such that the shaft 172 of each thread fastener 170 extends through a bracket hole 210 as shown in FIG. 6. A nut 176 threadingly engaged with the shaft 172 securely attaches the light-weight body mount assembly 10 to the frame 20 and a threaded fastener 180 with a head 182, a threaded shaft 184 and a nut 186 securely attaches the vehicle body 30 to the light-weight body mount assembly 10 and the frame 20. It should be understood that the light-weight body mount assembly 10 is devoid of an outer metal sleeve.

Figure 7:
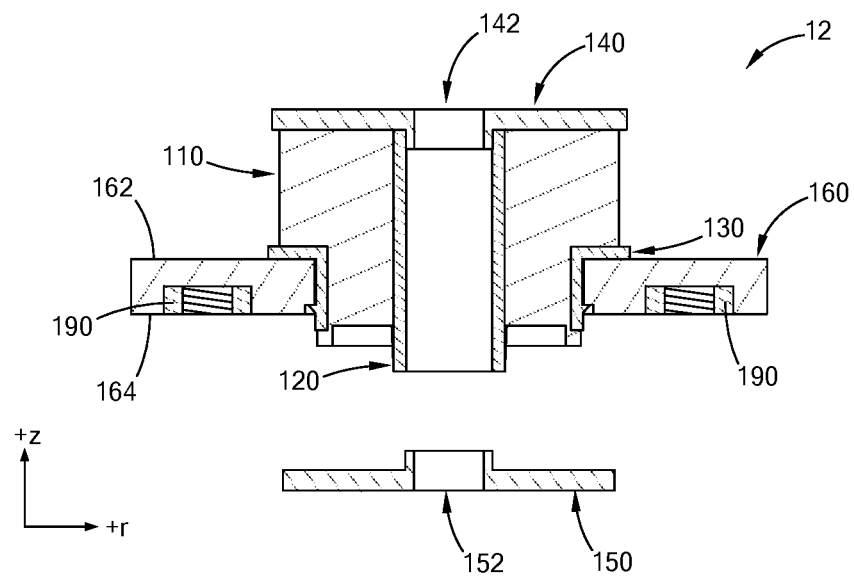
FIG. 7 is a cross-sectional view of a light-weight body mount assembly according to another form of the present disclosure.

While FIGS. 2, 4, and 6 show the heads 174 of the threaded fasteners 170 embedded within the mounting bracket 160, in at least one form of the present disclosure, nuts 190 are embedded within the mounting bracket 160 as shown by the light-weight body mount assembly 12 in FIG. 7. In such a form, a threaded fastener (e.g., a bolt) can extend through the apertures 212 of the panel 200 and threadingly engage the nuts 190 such that the light-weight body mount assembly 10 is securely attached to the frame 20. It should be understood that the light-weight body mount assembly 10 shown in FIG. 7 provides more compact storage and/or shipping compared to the light-weight body mount assembly 12 shown in FIG. 2, and/or allows an end user (e.g., an Original Equipment Manufacturer (OEM)) to use separately provided threaded fasteners securely attach the light-weight body mount assemblies 12 to frames 20.

Figure 8:
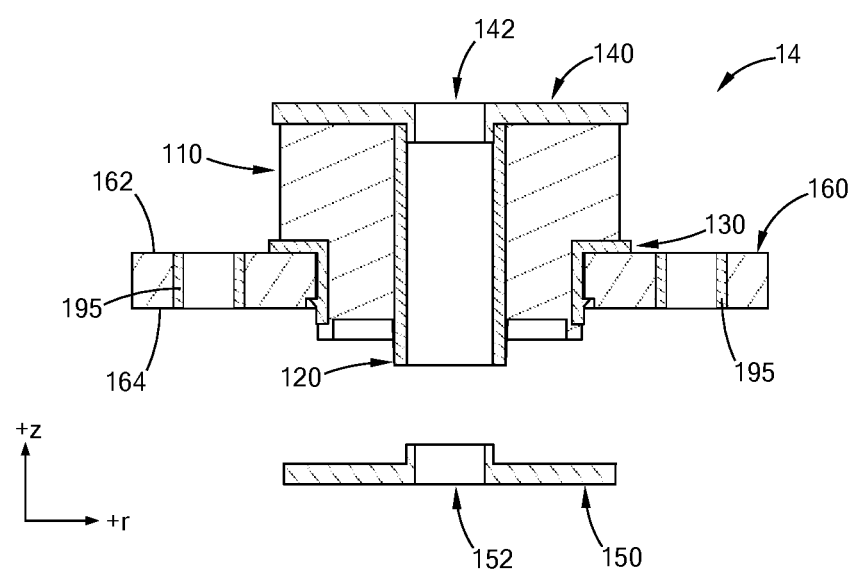
FIG. 8 is a cross-sectional view of a light-weight body mount assembly according to still another form of the present disclosure.

Referring to FIG. 8, in still another form of the present disclosure, a light-weight body mount assembly 14 with a pair of sleeves 195 embedded within the mounting bracket 160 is shown. The sleeves 195 provide or allow the use of separate threaded fasteners (not shown) such as nut and bolt fasteners to securely attach the light-weight body mount assembly 14 to the frame 20. It should be understood that the light-weight body mount assembly 14 shown in FIG. 8 provides more compact storage and/or shipping of a plurality of light-weight body mount assemblies 14, compared to the light-weight body mount assembly 10 shown in FIG. 2, and/or allows an end user to use separately provided threaded fasteners to (e.g., nuts and bolts) to securely attach the light-weight body mount assemblies 14 to frames 20.

Figure 9:
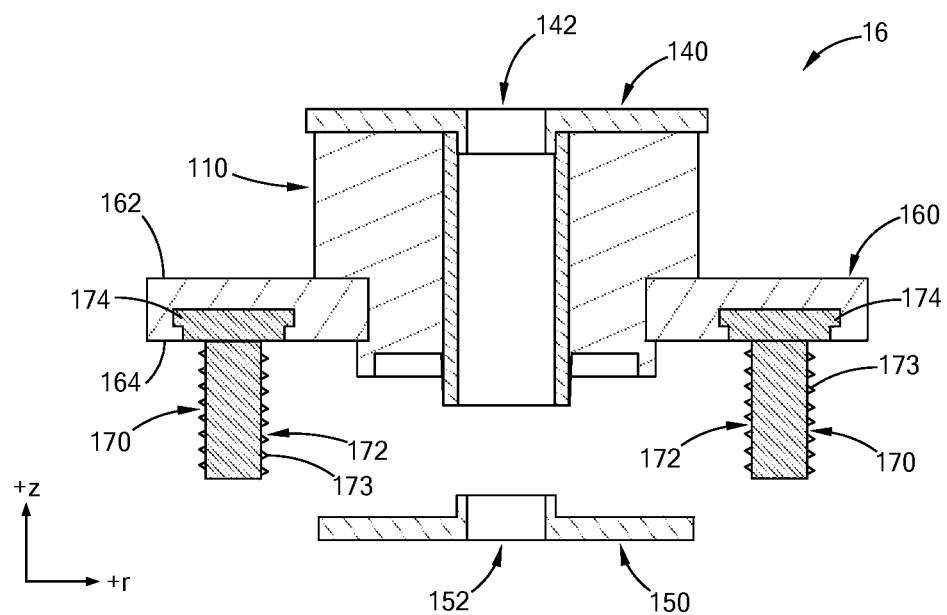
FIG. 9 is a cross-sectional view of a light-weight body mount assembly according to still yet another form of the present disclosure.

Referring now to FIG. 9, in still yet another form of the present disclosure, a light-weight body mount assembly 16 is shown. The light-weight body mount assembly 16 includes the elastomeric damper 110 disposed directly between the inner metal sleeve 120 and the mounting bracket 160. That is, the light-weight body mount assembly 10 shown in FIG. 8 does not include the outer sleeve 130. In some variations the elastomeric damper 110 is molded directly onto the inner metal sleeve 120 and the mounting bracket 160. Also, the light-weight body mount assembly 16 has the pair of threaded fasteners 170 with the heads 174 embedded within the mounting bracket 160. In the alternative, the light-weight body mount assembly 16 shown in FIG. 9 has the nuts 190 (FIG. 7) and/or the sleeves 195 (FIG. 7) embedded within the mounting bracket 160.

It should be understood from the teachings of the present disclosure that a light-weight body mount assembly without an outer metal sleeve or outer metal cover is provided. The light-weight body mount assembly provides a secure attachment of a vehicle body to a vehicle frame and is corrosion resistant (without a corrosion resistant coating), weighs less, and costs less compared to body mount assemblies with an outer metal sleeve or outer metal cover.

When an element or layer is referred to as being "on," "mounted on", "engaged to," "connected to", "coupled to," or "attached to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in like fashion (e.g., "between" versus "directly between," "adjacent" versus "directly adjacent," etc.). As used herein, the term "and/or" includes any and all combinations of one or more of the associated listed items.

Although the terms first, second, third, etc. may be used to describe various elements, components, regions, layers and/or sections, these elements, components, regions, layers and/or sections, should not be limited by these terms. These terms may be only used to distinguish one element, component, region, layer and/or section, from another element, component, region, layer and/or section. Terms such as "first," "second," and other numerical terms when used herein do not imply a sequence or order unless clearly indicated by the context. Thus, a first element, component, region, layer or section, could be termed a second element, component, region, layer or section without departing from the teachings of the example forms. Furthermore, an element, component, region, layer or section may be termed a "second" element, component, region, layer or section, without the need for an element, component, region, layer or section termed a "first" element, component, region, layer or section.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above or below. The device may be otherwise oriented (rotated 90 degrees or at other orientations) and the spatially relative descriptors used herein interpreted accordingly.

As used herein, the phrase at least one of A, B, and C should be construed to mean a logical (A OR B OR C), using a non-exclusive logical OR, and should not be construed to mean "at least one of A, at least one of B, and at least one of C.

Unless otherwise expressly indicated, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The terminology used herein is for the purpose of describing particular example forms only and is not intended to be limiting. The singular forms "a," "an," and "the" may be intended to include the plural forms as well, unless the context clearly indicates otherwise. The terms "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, examples that do not depart from the substance of the disclosure are intended to be within the scope of the disclosure. Such examples are not to be regarded as a departure from the spirit and scope of the disclosure. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A vehicle body mount assembly comprising:
   an inner metal sleeve disposed about an axis and including an outer surface;
   a polymer mounting bracket defining a damper opening oriented coaxially with the inner metal sleeve;
   an elastomeric damper, a first portion of the elastomeric damper being disposed within the damper opening, the first portion of the elastomeric damper contacting the outer surface of the inner metal sleeve and being disposed between the inner metal sleeve and the polymer mounting bracket;
   an outer sleeve including a sidewall disposed between and contacting the polymer mounting bracket and the first portion of the elastomeric damper;
   at least one fastening element at least partially embedded in the polymer mounting bracket; and
   a ferrule disposed at least partially within the inner metal sleeve.

2. The vehicle body mount assembly according to claim 1, wherein the polymer mounting bracket and the outer sleeve are each formed from a thermoplastic material selected from the group consisting of nylon, polybenzimidazole (PBI), polycarbonate (PC), polyether sulfone (PES), polyoxymethylene (POM), polyether ether ketone (PEEK), polyetherimide (PEI), polyethylene (PE), polyphenylene oxide (PPO), polyphenylene sulfide (PPS), polypropylene (PP), polyvinyl chloride (PVC), polyvinylidene fluoride, PVDF, and combinations thereof.

3. The vehicle body mount assembly according to claim 1, wherein the elastomeric damper is molded onto the inner metal sleeve and the outer sleeve.

4. The vehicle body mount assembly according to claim 1, wherein the elastomeric damper comprises a first end and a second end spaced apart from the first end, the inner metal sleeve extends between the first end and the second end, the ferrule is a metal ferrule disposed on the first end, and the polymer mounting bracket is disposed proximate to the second end and spaced apart from the metal ferrule.

5. The vehicle body mount assembly according to claim 1, wherein the at least one fastening element comprises at least one stud bolt with a head embedded in the polymer mounting bracket and a threaded shaft extending from the polymer mounting bracket away from the head.

6. The vehicle body mount assembly according to claim 1, wherein the at least one fastening element comprises at least one nut embedded in the polymer mounting bracket.

7. The vehicle body mount assembly according to claim 1, wherein the at least one fastening element comprises at least one metal sleeve embedded in the polymer mounting bracket and the at least one metal sleeve is configured for a bolt to extend therethrough.

8. The vehicle body mount assembly according to claim 1 further comprising another metal ferrule disposed on the inner metal sleeve.

9. The vehicle body mount assembly according to claim 1, wherein the at least one fastening element is a pair of threaded fasteners, each of the pair of threaded fasteners comprises a head portion embedded in the polymer mounting bracket and a shaft portion extending from the polymer mounting bracket, and the pair of threaded fasteners are positioned and configured to extend through a pair of apertures in a vehicle frame component such that a locking joint is formed between the vehicle body mount assembly and the vehicle frame component.

10. A vehicle body mount assembly consisting essentially of:
an inner sleeve disposed about an axis and including an outer surface;
a mounting bracket including an inner surface that defines a damper opening oriented coaxially about the inner sleeve;
an elastomeric damper, wherein a first portion of the elastomeric damper contacts the outer surface of the inner sleeve and is disposed radially between the inner sleeve and the inner surface of the mounting bracket;
an outer sleeve including a sidewall disposed radially between and contacting the first portion of the elastomeric damper and the inner wall of the mounting bracket;
at least one fastening element at least partially embedded in the mounting bracket; and
at least one ferrule disposed partially within the inner sleeve.

11. The vehicle body mount assembly according to claim 10, wherein the inner sleeve is an inner metal sleeve, the at least one ferrule includes a first metal ferrule, wherein the outer sleeve is a thermoplastic outer sleeve, and the mounting bracket is a thermoplastic mounting bracket.

12. The vehicle body mount assembly according to claim 11, wherein the at least one fastening element comprises at least one of:
a stud bolt with a head embedded in the thermoplastic mounting bracket,
a nut embedded in the thermoplastic mounting bracket, and
a metal sleeve, configured for a threaded shaft to extend therethrough, embedded in the thermoplastic mounting bracket.

13. A vehicle body mount assembly comprising:
an inner sleeve disposed about an axis and including an outer surface;
a mounting bracket including an inner surface that defines a damper opening oriented coaxially about the inner sleeve;
an elastomeric damper, wherein a first portion of the elastomeric damper contacts the outer surface of the inner sleeve and is disposed radially between the inner sleeve and the inner surface of the mounting bracket;
an outer sleeve including a sidewall and a flange, wherein the sidewall is disposed radially between and contacting the first portion of the elastomeric damper and the inner wall of the mounting bracket, wherein the flange extends radially outward of the damper opening, wherein the second portion of the elastomeric damper contacts the outer surface of the inner sleeve and extends radially outward of the damper opening and contacts the flange;
at least one fastening element at least partially embedded in the mounting bracket; and
a first ferrule disposed partially within the inner sleeve, the first ferrule contacting the second portion of the elastomeric damper.

14. The vehicle body mount assembly according to claim 13, wherein the inner sleeve is an inner metal sleeve, the ferrule is a metal ferrule, and the mounting bracket is a thermoplastic mounting bracket.

15. The vehicle body mount assembly according to claim 14, wherein the at least one fastening element comprises at least one of a stud bolt with a head embedded in the thermoplastic mounting bracket, a nut embedded in the thermoplastic mounting bracket, and a metal sleeve embedded in the thermoplastic mounting bracket, the metal sleeve configured for a threaded shaft to extend therethrough.

16. The vehicle body mount assembly according to claim 1, wherein the outer sleeve includes a flange that extends radially outward of the damper opening, wherein a second portion of the elastomeric damper contacts the inner metal sleeve and extends radially outward of the damper opening, wherein the second portion of the elastomeric damper is axially between ferrule and the flange.

17. The vehicle body mount assembly according to claim 16, wherein the second portion of the elastomeric damper contacts the ferrule and the flange.

18. The vehicle body mount assembly according to claim 13, wherein the outer flange includes a rib that extends radially outward from the sidewall and is axially spaced apart from the flange, wherein the rib contacts the mounting bracket.

19. The vehicle body mount assembly according to claim 13, further comprising a second ferrule, wherein the first ferrule extends into a first end of the inner sleeve and the second ferrule extends into a second end of the first sleeve.

20. The vehicle body mount assembly according to claim 19, wherein the second ferrule is axially spaced apart from the elastomeric damper.

* * * * *